US011149677B1

(12) United States Patent
Charbonnel et al.

(10) Patent No.: US 11,149,677 B1
(45) Date of Patent: Oct. 19, 2021

(54) CONTROL OF CYLINDERS OF AN ENGINE ACCORDING TO AN ENGINE CONFIGURATION SCHEME

(71) Applicant: Caterpillar Inc., Peoria, IL (US)

(72) Inventors: Sylvain J. Charbonnel, Peoria, IL (US); Kevin Lloyd Dea, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/949,555

(22) Filed: Nov. 3, 2020

(51) Int. Cl.
*F02D 41/24* (2006.01)
*F02D 41/38* (2006.01)
*F02D 41/00* (2006.01)
*F02D 13/02* (2006.01)
*G06N 3/04* (2006.01)
(Continued)

(52) U.S. Cl.
CPC ......... *F02D 41/38* (2013.01); *F02D 13/0223* (2013.01); *F02D 41/0082* (2013.01); *F02D 41/2432* (2013.01); *F02D 41/2438* (2013.01); *F02D 41/2477* (2013.01); *G05B 13/027* (2013.01); *G06N 3/0445* (2013.01); *G06N 3/08* (2013.01); *F02D 2200/024* (2013.01); *F02D 2200/04* (2013.01); *F02D 2200/0602* (2013.01); *F02D 2200/0614* (2013.01); *F02D 2200/0618* (2013.01); *F02D 2200/1002* (2013.01); *F02D 2200/70* (2013.01)

(58) Field of Classification Search
CPC .. F02D 41/38; F02D 41/2432; F02D 41/2438; F02D 41/2477; F02D 41/0082; F02D 13/0223; F02D 2200/70; F02D 2200/04; F02D 2200/0618; F02D 2200/1002; F02D 2200/024; F02D 2200/0602; F02D 2200/0614; G05B 13/027; G06N 3/0445; G06N 3/08
USPC ....... 123/672, 674, 691, 692, 472, 478, 480, 123/481, 198 F; 701/103, 104, 105, 108, 701/112
See application file for complete search history.

(56) References Cited

U.S. PATENT DOCUMENTS 6,679,221 B2 * 1/2004 Bassi .................. F02D 41/0027
123/198 F
6,907,725 B2 6/2005 Szymkowicz et al.
(Continued)

FOREIGN PATENT DOCUMENTS

DE 102013216097 A1 2/2014
WO 03/048533 A1 6/2003

*Primary Examiner* — Hai H Huynh
(74) *Attorney, Agent, or Firm* — Harrity & Harrity, LLP

(57) ABSTRACT

An engine optimization controller may determine values of a set of input parameters of an engine and process, using an engine model, the values to determine a plurality of sets of potential output parameters. The engine optimization controller may determine, based on the plurality of sets of potential output parameters, an engine optimization scheme, which may indicate a first number of cylinders, of one or more cylinders of the engine, to be active and to receive gas; a second number of cylinders, of the one or more cylinders, to be inactive and to receive gas, and/or a third number of cylinders, of the one or more cylinders, to be inactive and to not receive gas. The engine optimization controller may provide the engine configuration scheme to another controller to allow control of the one or more cylinders and one or more fuel injectors according to the engine configuration scheme.

20 Claims, 5 Drawing Sheets

(51) Int. Cl.
*G06N 3/08* (2006.01)
*G05B 13/02* (2006.01)

(56) References Cited

U.S. PATENT DOCUMENTS

| | | |
|---|---|---|
| 7,647,919 B2 * | 1/2010 | Moller .................... F02D 41/20 |
| | | 123/478 |
| 8,146,565 B2 | 4/2012 | Leone et al. |
| 9,512,794 B2 | 12/2016 | Serrano et al. |
| 10,267,240 B2 | 4/2019 | Sommerhoff et al. |
| 10,330,040 B2 * | 6/2019 | Surnilla .............. F02D 41/3076 |
| 10,968,853 B2 * | 4/2021 | Surnilla ................. F02M 65/00 |
| 2014/0121846 A1 * | 5/2014 | Dase ....................... F02D 41/26 |
| | | 700/283 |
| 2020/0123987 A1 | 4/2020 | Dudar |
| 2020/0191078 A1 | 6/2020 | Fuschetto et al. |
| 2020/0218258 A1 | 7/2020 | Subramanian et al. |

* cited by examiner

CONTROL OF CYLINDERS OF AN ENGINE ACCORDING TO AN ENGINE CONFIGURATION SCHEME

TECHNICAL FIELD

The present disclosure relates generally to control of cylinders of an engine and, for example, to control of cylinders of the engine according to an engine configuration scheme.

BACKGROUND

An internal combustion engine, such as a diesel engine, supplies a mixture of air and fuel to cylinders of the engine to allow the cylinders to combust the mixture and generate operational power. However, in some situations (e.g., during an idling event, a low engine load event, and/or a high temperature exhaust gas event, among other examples) supplying the mixture to all cylinders may not be an effective and/or efficient use of fuel and air. This can also create unnecessary production of exhaust gas that contains a variety of pollutants, such as particulate matter (e.g., soot), nitrogen oxides ($NO_x$), and/or sulfur compounds.

U.S. Pat. No. 9,512,794 (the '794 patent) discloses a skip fire engine control system for an internal combustion engine, wherein skip fire engine control contemplates selectively skipping the firing of certain cylinders during selected firing opportunities. Per the '794 patent, a firing fraction calculator receives a torque request signal and determines a skip firing fraction that would be appropriate to deliver the desired torque under selected engine operations and that has acceptable noise, vibration, and harshness (NVH) characteristics. According to the '794 patent, any suitable data structure or algorithm may be used to make determinations.

While the '794 patent is directed to providing a skip firing fraction for controlling cylinders of an engine, the skip firing fraction does not indicate whether an individual cylinder is to receive fuel, to receive air, or to receive a mixture of both fuel and air. Further, the skip firing fraction is generated to address a limited number of parameters (e.g., torque and NVH) of an engine, not to an overall performance of the engine. Further, the '794 discloses only using a data structure or an algorithm to determine the skip firing fraction, as opposed to a machine learning model or other artificial intelligence model.

Accordingly, an engine optimization controller of the present disclosure solves one or more of the problems set forth above and/or other problems in the art.

SUMMARY

In some implementations, a system comprises: one or more cylinders of an engine; one or more fuel injectors configured to inject fuel into respective cylinders of the one or more cylinders of the engine; and an engine optimization controller configured to, while the engine is under operation: determine values of a set of input parameters of the engine; process, using an engine model, the values to determine a plurality of sets of potential output parameters; determine, based on the plurality of sets of potential output parameters, an engine configuration scheme, wherein the engine configuration scheme indicates a first number of cylinders, of the one or more cylinders, to be active and to receive gas and at least one of: a second number of cylinders, of the one or more cylinders, to be inactive and to receive gas, or a third number of cylinders, of the one or more cylinders, to be inactive and to not receive gas; and provide the engine configuration scheme to another controller to cause the other controller to control the one or more cylinders and the one or more fuel injectors according to the engine configuration scheme.

In some implementations, a controller includes one or more memories; and one or more processors communicatively coupled to the one or more memories, configured to: determine values of a set of input parameters of an engine under operation; process, using an engine model, the values to determine a plurality of sets of potential output parameters; determine, based on the plurality of sets of potential output parameters, an engine configuration scheme, wherein the engine configuration scheme indicates a first number of cylinders, of one or more cylinders of the engine, to be active and to flow gas and at least one of: a second number of cylinders, of the one or more cylinders, to be inactive and to flow gas, or a third number of cylinders, of the one or more cylinders, to be inactive and to not flow gas; and provide the engine configuration scheme to another controller to cause the other controller to control the one or more cylinders and one or more fuel injectors according to the engine configuration scheme.

In some implementations, a method includes obtaining, by a controller, a set of input parameters of an engine under operation; determining, by the controller, values of the set of input parameters; processing, by the controller, the values to determine a plurality of sets of potential output parameters; determining, based on the plurality of sets of potential output parameters, an engine configuration scheme, wherein the engine configuration scheme indicates a first subset of cylinders, of a set of cylinders of the engine, to be active and to flow gas and at least one of: a second subset of cylinders, of the set of cylinders, to be inactive and to flow gas, or a third subset of cylinders, of the set of cylinders, to be inactive and to not flow gas; and causing, by the controller, the one or more cylinders and one or more fuel injectors of the engine to be controlled according to the engine configuration scheme.

DETAILED DESCRIPTION

This disclosure relates to cylinder control according to an engine configuration scheme generated by an engine optimization controller. The engine optimization controller has universal applicability to any machine utilizing such an engine optimization to control cylinders of an engine. The term "machine" may refer to any machine that performs an operation associated with an industry such as, for example, mining, construction, farming, transportation, or any other industry. As some examples, the machine may be a vehicle, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, or other above ground equipment; stationary equipment, such as a genset or a generator; underground equipment; or marine equipment.

Figure 1:
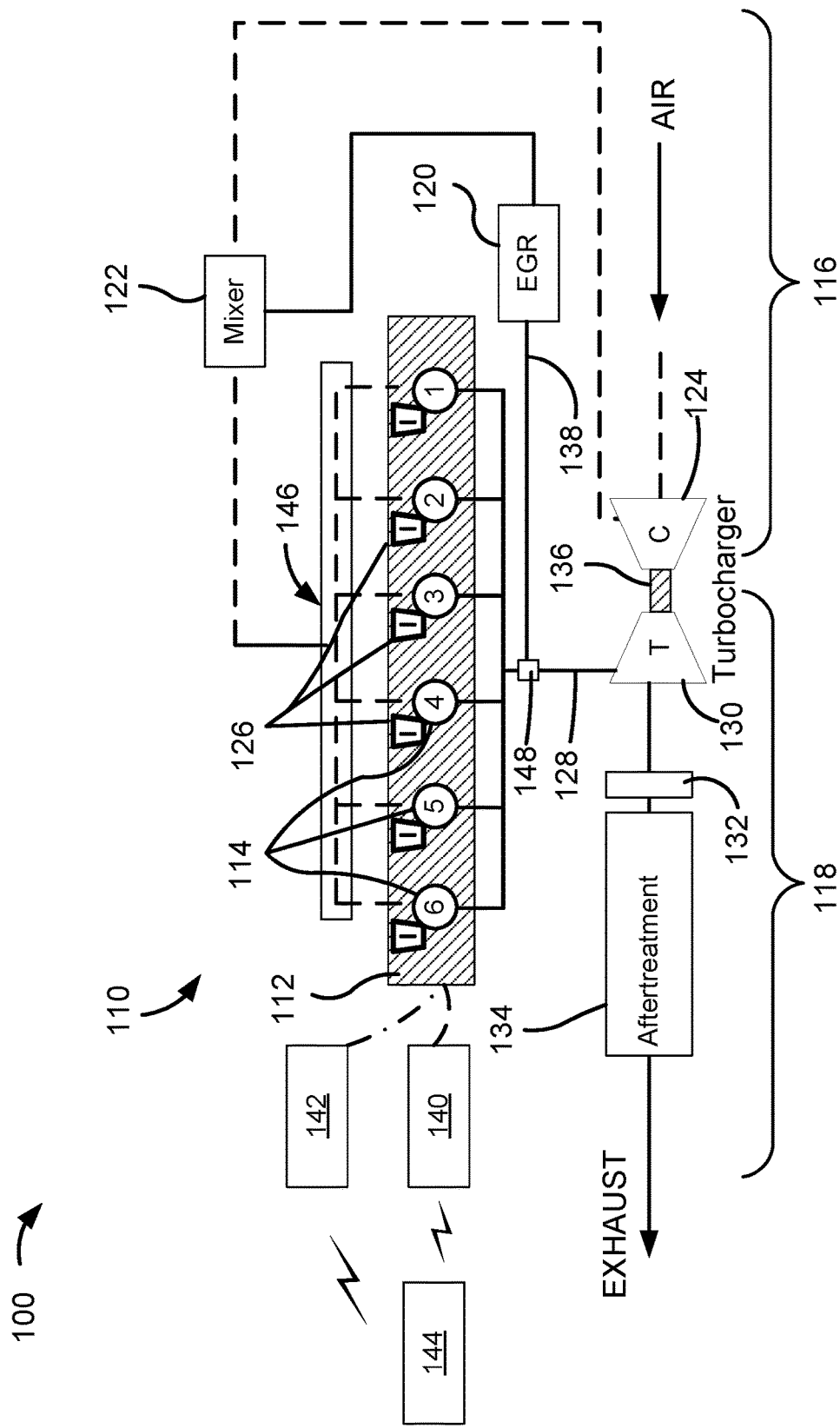
FIG. 1 is a diagram of an example power system described herein.

FIG. 1 is a diagram of an example power system 100 described herein. As shown, power system 100 includes an engine 110, which may be described herein as a compression ignition, internal combustion engine. However, engine 110 may include any other type of internal combustion engine, such as, for example, a spark, laser, a plasma ignition engine, and/or the like. Engine 110 may be fueled by any desired fuel, such as distillate diesel fuel, biodiesel, dimethyl ether, gaseous fuels, such as hydrogen, natural gas, propane, alcohol, ethanol, and/or any combination thereof.

Engine 110, of FIG. 1, includes an engine block 112 with a plurality of cylinders 114 (engine block 112 of FIG. 1 is shown with six cylinders 114). A piston assembly may be included within each of cylinders 114 to form a combustion chamber within each cylinder 114. Engine 110 may include any number of combustion chambers, and the combustion chambers may be disposed in an in-line configuration, a "V" configuration, or in any other suitable configuration. Furthermore, engine 110 may consume one or more consumable resources (e.g., a fuel (e.g., gasoline, diesel fuel, and/or the like), a diesel exhaust fluid (DEF), one or more coolants, one or more lubricants (e.g., an oil, a grease, and/or the like), and/or the like) during operation (e.g., due to combustion in the engine block).

Engine 110 may include multiple systems. For example, as shown in the example of FIG. 1, engine 110 may include an air intake or air induction system 116, an exhaust system 118, and an exhaust gas recirculation (EGR) system 120. Air induction system 116 may be configured to direct air, or an air and fuel mixture (e.g., of air and another gas, such as exhaust gas) into engine 110 for subsequent combustion. Exhaust system 118 may exhaust or release byproducts of the combustion to an atmosphere external to engine 110. A recirculation loop of EGR system 120 may be configured to direct a portion of the exhaust gases from exhaust system 118 back into air induction system 116 for subsequent combustion.

Air induction system 116 may include multiple components that cooperate to condition and introduce compressed air into cylinders 114. For example, air induction system 116 may include a mixer 122, located upstream of an intake manifold 146, located downstream of one or more compressors 124. As described further herein, each cylinder, of the cylinders 114, may be associated with a valve (e.g., an input valve of cylinder 114) that may be positioned to allow or prevent a flow of gas (e.g., air from air induction system 116 and/or exhaust gas from EGR system 120) into the cylinder.

Air induction system 116 may feed air to respective ones of cylinders 114. In some implementations, air induction system 116 may include a throttle valve, an air cooler, a filtering component, a compressor bypass component, and/or the like. Fuel injectors 126 may inject fuel into cylinders 114. As described further herein, a first set of fuel injectors 126 may inject a desired quantity (or volume) of fuel in a first set of cylinders 114 and a second set of fuel injectors 126 may refrain from injecting fuel according to an engine configuration scheme.

Exhaust system 118 may include multiple components that cooperate to condition and direct exhaust from cylinders 114 to the atmosphere. For example, exhaust system 118 may include an exhaust passageway 128, one or more turbines 130 driven by exhaust flowing through exhaust passageway 128, a particulate collection device 132, such as a diesel particulate filter (DPF) located downstream of turbine 130, and an exhaust aftertreatment device 134 (e.g., an aftertreatment selective catalytic reduction (SCR)) fluidly connected downstream of particulate collection device 132. In some implementations, exhaust system 118 may include one or more bypass components, an exhaust compression or restriction brake, an attenuation device, additional exhaust treatment devices, and/or the like.

Turbine 130 may be located to receive exhaust leaving engine 110 and may be connected to the one or more compressors 124 of air induction system 116 by way of a common shaft 136 to form a turbocharger (e.g., a variable geometry turbocharger (VGT)). As exhaust gases exiting engine 110 flow through turbine 130 and expand against vanes thereof, turbine 130 may rotate and drive the one or more compressors 124 to pressurize inlet air.

Particulate collection device 132 may be a DPF located downstream of turbine 130 to remove particulate matter from a flow of exhaust gas of engine 110. Collected particulates may be removed through a regeneration process, which requires a temperature of the exhaust gas entering particulate collection device 132 to be high enough (e.g., greater than 150° C., 200° C., 250° C., and/or the like, depending on the configuration), in combination with a catalyst, to burn away trapped particulates. As part of the regeneration process, heat from the exhaust gas is applied to the trapped particulates to elevate the temperature thereof to an ignition threshold.

Exhaust aftertreatment device 134 may receive exhaust from turbine 130 and trap or convert particular constituents (e.g., $NO_x$) in the exhaust gas stream. Similar to the particulate collection device 132, the temperature of the exhaust gas flow entering exhaust aftertreatment device 134 needs to be high enough, in combination with an oxidation catalyst and/or a reductant, to react with $NO_x$ in the exhaust gas to form water ($H_2O$) and elemental nitrogen ($N_2$).

EGR system 120 may redirect gases from exhaust system 118 back into air induction system 116 for subsequent combustion. EGR is a process whereby exhaust gas from the engine is recirculated back into air induction system 116 for subsequent combustion. The recirculated exhaust gases may reduce the concentration of oxygen within the combustion chambers, and simultaneously lower the maximum combustion temperature therein. The reduced oxygen levels may provide fewer opportunities for chemical reaction with the nitrogen present, and the lower temperature may slow the chemical process that results in the formation of $NO_x$. As mentioned above, a cooler may be included to cool the exhaust gases before the gases are combusted.

When utilizing EGR in a turbocharged diesel engine, as shown in FIG. 1, the exhaust gas to be recirculated may be removed upstream of the exhaust gas driven turbine 130 associated with the turbocharger. For example, in many EGR applications, the exhaust gas may be diverted (e.g., via a valve 148) from the exhaust passageway 128 and diverted via an EGR conduit 138 to air induction system 116. Likewise, the recirculated exhaust gas may be re-introduced to the air induction system 116 downstream of the compressor 124.

Engine 110 of FIG. 1 is associated with a controller 140 (e.g., an engine control module (ECM)). Controller 140, as described herein, controls engine 110 in order to operate the engine 110 based on engine operating conditions as indicated by a sensor system 142 and/or an engine configuration scheme provided by an engine optimization controller 144. Controller 140 may perform various control functions and processes to control engine 110. Controller 140 may include any appropriate type of engine controller configured to perform engine control functions such that engine 110 may operate properly (e.g., according to the engine configuration scheme). Further, controller 140 may also control another system of a vehicle or a machine associated with engine 110, such as a transmission system, a hydraulics system, and/or the like.

Sensor system 142 may provide measurements associated with various parameters used by controller 140 to control engine 110 and/or used by engine optimization controller 144 to determine the engine configuration scheme. Sensor system 142 may include physical sensors and/or any appropriate type of control system that generates values of parameters based on a computational model and/or one or more measurements. Example sensors may include temperature sensors, speed sensors, chemical composition sensors (e.g., a NOx emission sensor), pressure sensors, and/or the like. Parameters may also include any output parameters that may be measured indirectly by sensors and/or calculated based on readings of the sensors. Measurements of the parameters, as used herein, may refer to any values relevant to the parameters and indicative of the state or condition of the engine 110. For example, measurements may include values associated with engine 110, a machine associated with engine 110, an environment of engine 110, and/or the like. Such values may correspond to speeds (e.g., an engine speed of engine 110), pressures (e.g., an injection pressure of one of the fuel injectors 126), temperatures, usage, usage rates, ambient conditions, fuel rates, and/or the like.

Sensor system 142 may be configured to coincide with controller 140, may be configured as a separate control system, and/or may be configured as a part of other control systems. Further, controller 140 may implement sensor system 142 by using computer software, hardware, or a combination of software and hardware.

Engine optimization controller 144 may determine and/or provide the engine configuration scheme to allow for optimization of one or more operating characteristics of engine 110. Accordingly, controller 140 may use the engine configuration scheme to control engine 110 and/or determine optimized settings for engine 110. Engine optimization controller 144 may be implemented as a processor, such as a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor may be implemented in hardware, firmware, and/or a combination of hardware and software. Engine optimization controller 144 may include one or more processors capable of being programmed to perform a function. One or more memories, including a random-access memory (RAM), a read only memory (ROM), and/or another type of dynamic or static storage device (e.g., a flash memory, a magnetic memory, and/or an optical memory) may store information and/or instructions for use by engine optimization controller 144. Engine optimization controller 144 may include a memory (e.g., a non-transitory computer-readable medium) capable of storing instructions, that when executed, cause the processor to perform one or more processes and/or methods described herein. Controller 140 may be similarly configured as engine optimization controller 144.

Engine optimization controller 144 may be configured to coincide with controller 140, may be configured as a separate controller, and/or may be configured as a part of other control systems. Further, controller 140 may at least partially implement engine optimization controller 144 by using computer software, hardware, or a combination of software and hardware. In some implementations, the controller 140, the sensor system 142, and/or the controller 144 may comprise a control system that controls operation of the engine 110, as described herein.

As indicated above, FIG. 1 is provided as an example. Other examples may differ from what is described in connection with FIG. 1.

Figure 2:
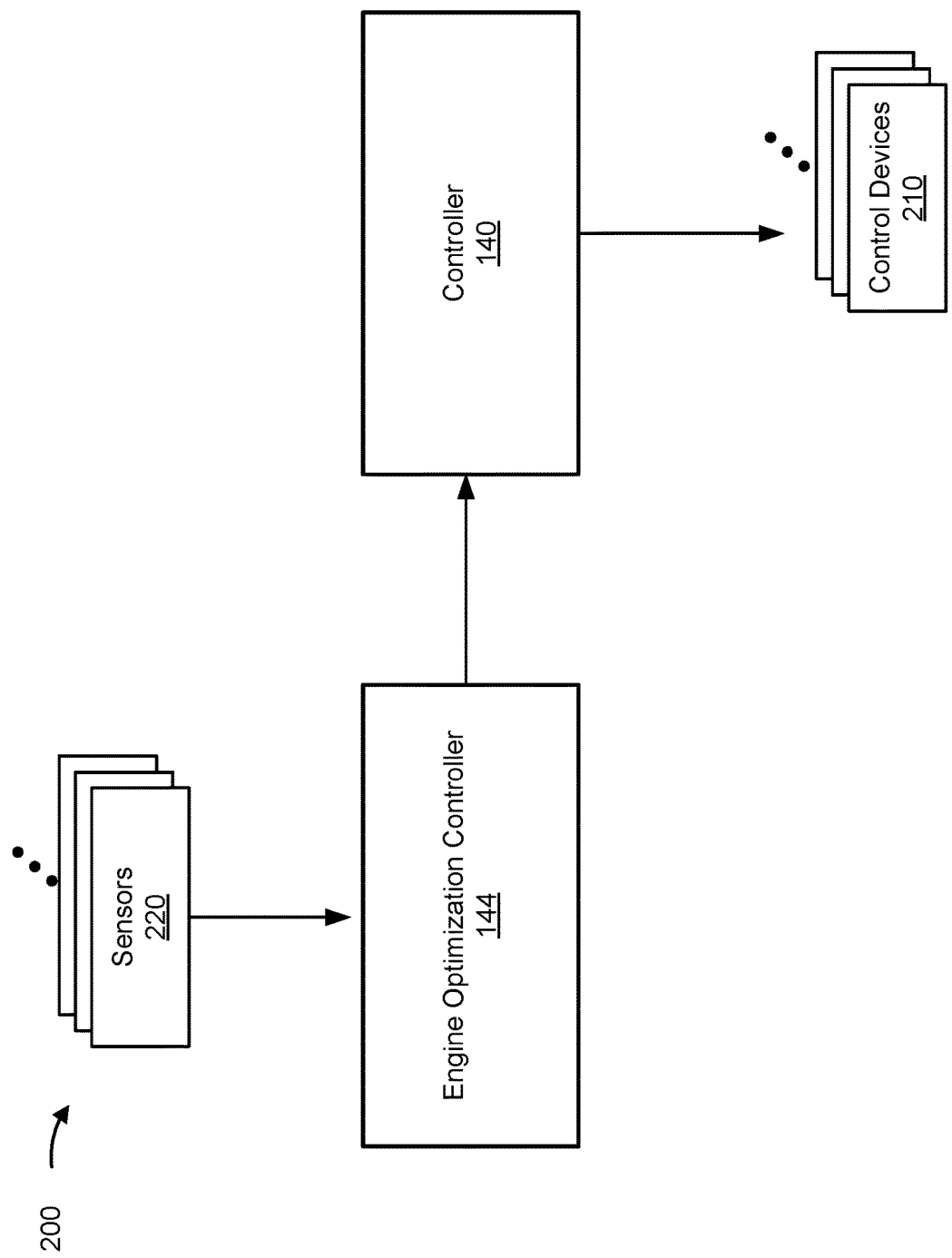
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more control devices 210 (referred to individually as "control device 210" and collectively as "control devices 210") and one or more sensors 220 (referred to individually as "sensor 220" and collectively as "sensors 220"), engine optimization controller 144, and controller 140. Devices and/or components of environment 200 may interconnect via wired connections, wireless connections, or a combination of wired and wireless connections.

Control device 210 may be any type of device that may be used by controller 140 to control a performance feature of power system 100. For example, control device 210 may include one or more actuators, switches, and/or the like that are capable of controlling a component of power system 100. Control device 210 may be capable of controlling fuel injectors 126 (e.g., cause fuel injectors 126 to provide fuel to at least one cylinder of cylinders 114 and/or to refrain from providing fuel to the at least one cylinder, among other examples), cylinders 114 (e.g., cause a valve associated with at least one cylinder of cylinders 114 to be positioned to allow air to flow to the at least one cylinder and/or to be positioned to prevent air to flow to the at least one cylinder, among other examples), and/or the like. Sensors 220 may include any type of sensor configured to measure operating conditions of power system 100. Sensors 220 may be sensors of sensor system 142, as described herein.

Engine optimization controller 144 may obtain a set of input parameters of engine 110 (e.g., while engine 110 is under operation) from sensors 220 (e.g., directly from sensors 220 or via one or more other components or devices of power system 100, such as controller 140). For example, engine optimization controller 144 may obtain one or more of the following parameters: a brake mean effective pressure (BMEP) associated with engine 110; an indicated mean effective pressure (IMEP) associated with engine 110; a friction mean effective pressure (FMEP) associated with engine 110; a pumping mean effective pressure (PMEP) associated with engine 110; a torque associated with engine 110; an exhaust gas temperature associated with engine 110; a peak cylinder pressure (PCP) associated with engine 110; a fresh mass air flow associated with engine 110; a total mass air flow (TMAF) associated with engine 110; a total mass exhaust flow (TMEF) associated with engine 110; an equivalence ratio associated with engine 110; a mass of charge associated with engine 110; a fuel mass flow associated with engine 110; a total fuel power associated with engine 110; a volumetric efficiency associated with engine 110; an amount of unburnt air associated with engine 110; an exhaust fuel conversion efficiency (EFCE) associated with engine 110; a gross fuel conversion efficiency (GFCE) associated with engine 110; an amount of pollution (e.g., comprising $NO_x$, hydrocarbons, and/or particulate matter) associated with an exhaust gas of engine 110; a number of active and/or inactive cylinders 114; a number of cylinders 114 receiving and/or flowing gas; a timing associated with fuel injectors 126; a pressure associated with fuel injectors 126; an ambient temperature associated with engine 110; an amount of harshness associated with engine 110; an amount of noise associated with engine 110; or an amount of mechanical vibrations associated with engine 110. The set of input parameters may include a subset of unalterable input parameters (e.g., the total fuel power associated with engine 110, the ambient temperature associated with engine 110, and/or the like that are not alterable based on controlling engine 110) and/or a subset of alterable input parameters (e.g., the torque associated with engine 110, the number of active and/or inactive cylinders 114, the number of cylinders 114 receiving and/or flowing gas, the timing associated with fuel injectors 126, the pressure associated with fuel injectors 126, and/or the like that may altered by controlling engine 110).

Engine optimization controller 144 may determine values of the set of input parameters. For example, engine optimization controller 144 may process (e.g., parse) the set of input parameters to determine a value of the BMEP associated with engine 110, a value of the IMEP associated with engine 110, a value of the FMEP associated with engine 110, a value of the PMEP associated with engine 110, a value of the torque associated with engine 110, and so on.

Engine optimization controller 144 may process the values of the set of input parameters to determine an engine configuration scheme. The engine configuration scheme may indicate one or more configurations for one or more components of engine 110 (e.g., to allow and/or cause engine 110 to provide an optimal performance in regard to one or more parameters of the set of input parameters). For example, the engine configuration scheme may indicate a number of cylinders, of cylinders 114, to be active (e.g., that are to receive fuel from fuel injectors 126) and/or a number of cylinders, of cylinders 114, to be inactive (e.g., that are to not receive fuel from fuel injectors 126). As an additional example, the engine configuration scheme may indicate a number of cylinders, of cylinders 114, to receive and/or to flow gas from air induction system 116 and/or EGR system 120 and/or a number of cylinders, of cylinders 114, to not receive and/or to not flow gas from air induction system 116 and/or EGR system 120. In another example, the engine configuration scheme may indicate a first number of cylinders, of cylinders 114, to be active and to receive and/or flow gas and may also indicate a second number of cylinders, of cylinders 114, to be inactive and to receive and/or flow gas and/or a third number of cylinders, of cylinders 114, to be inactive and to not receive and/or to not flow gas.

In some implementations, the engine configuration scheme may identify particular cylinders to control. For example, the engine configuration scheme may indicate a first set of cylinders, of cylinders 114, to be active and/or a second set of cylinders, of cylinders 114, to be inactive. As an additional example, the engine configuration scheme may indicate a first set of cylinders, of cylinders 114, to receive and/or to flow gas and/or a second set of cylinders, of cylinders 114, to not receive and/or to not flow gas from air induction system 116 and/or EGR system 120. In another example, the engine configuration scheme may indicate a set of cylinders, of cylinders 114, to activate and receive and/or flow gas and may also indicate a second set of cylinders, of cylinders 114, to deactivate and to receive and/or flow gas, and/or a third set of cylinders, of cylinders 114, to deactivate and to not receive and/or to not flow gas.

In some implementations, the engine configuration scheme may indicate configuration information concerning one or more other components of engine 110, such as a position of one or more components of the turbocharger of engine 110, a position of the throttle valve of air induction system 116, and/or a target diversion amount associated with EGR system 120, among other examples.

In some implementations, to determine the engine configuration scheme, engine optimization controller 144 may process the respective values of the set of input parameters to determine a plurality of sets of potential output parameters associated with engine 110. A set of potential output parameters may include some or all of the same parameters as the set of input parameters. For example the set of potential output parameters may include the BMEP associated with the engine 110, the IMEP associated with the engine 110, and/or the FMEP associated with the engine 110, among other examples, as described above. A set of potential output parameters may be associated with a potential engine configuration scheme and engine optimization controller 144 may determine respective values of the set of potential output parameters by using an engine model to process the respective values of the set of input parameters according to the potential engine configuration scheme. Accordingly, engine optimization controller 144 may use the engine model to process the respective values of the set of input parameters according to a plurality of potential engine configuration schemes to determine the plurality of sets of potential output parameters.

Engine optimization controller 144 may select a set of potential output parameters, from the plurality of sets of potential output parameters, that will provide a preferred (e.g., optimal) performance (e.g., when used to control engine 110). For example, engine optimization controller 144 may select a set of potential output parameters that provides a preferred torque associated with engine 110, a preferred amount of pollution associated with an exhaust gas of engine 110, a preferred amount of noise associated with engine 110, and/or a preferred amount of mechanical vibrations associated with engine 110, among other examples. Accordingly, engine optimization controller 144 may select the potential engine configuration scheme associated with the selected set of potential output parameters as the engine configuration scheme (e.g., the engine configuration scheme to be used to control engine 110).

The engine model may include an artificial neural network (ANN), a recurrent neural network (RNN) model, a long short-term memory (LSTM) model, a self-attention neural network model, a combination of one or more of the RNN model, the LSTM model, or the self-attention neural network model, and/or the like. The engine model may be trained (e.g., prior to receiving and/or determining the respective values of the set of input parameters) using one or more training values (e.g., historical values) for one or more parameters of the engine and/or parameters specific to cylinders 114 and/or fuel injectors 126 that are to be used to determine the plurality of sets of potential output parameters. The training values for the set of input parameters may correspond to various values for a set of input parameters that are to be processed by the engine model to determine the plurality of sets of potential output parameters. The training values for the set of input parameters may be values based on a plurality of different calibrations for optimizing engines under operation.

Engine optimization controller 144 may provide the engine configuration scheme (e.g., the selected potential engine configuration scheme associated with the selected set of potential output parameters) to controller 140. Accordingly, controller 140 may control one or more components of engine 110, such as cylinders 114 and/or fuel injectors 126, according to the engine configuration scheme.

For example, controller 140 may cause a first set of cylinders, of cylinders 114, to be active and/or a second set of cylinders, of cylinders 114, to be inactive. Accordingly, controller 140 may cause (e.g., by sending one or more control signals to control devices 210) fuel injectors 126 to provide fuel to the first set of cylinders and to refrain from providing fuel to the second set of cylinders. As another example, controller 140 may cause a first set of cylinders, of cylinders 114, to receive and/or to flow gas and/or a second set of cylinders, of cylinders 114, to not receive and/or to not flow gas. Accordingly, controller 140 may cause (e.g., by sending one or more control signals to control devices 210) respective valves associated with the first set of cylinders to be positioned (e.g., in an "open" position) to allow the first set of cylinders to receive and/or to flow gas and/or cause respective valves associated with the second set of cylinders to be positioned (e.g., in a "closed" position) to prevent the second set of cylinders from receiving and/or flowing gas.

As an additional example, controller 140 may cause a first set of cylinders, of cylinders 114, to be active (e.g., to receive fuel from fuel injectors 126) and to receive gas via respective valves associated with the first set of cylinders; a second set of cylinders, of cylinders 114, to be inactive (e.g., to not receive fuel from fuel injectors 126) and to receive gas via respective valves associated with the second set of cylinders; and/or a third set of cylinders, of cylinders 114, to be inactive (e.g., to not receive fuel from fuel injectors 126) and to not receive gas via respective valves associated with the third set of cylinders. A number of the first set of cylinders, a number of the second set of cylinders, and/or a number of the third set of cylinders may be respectively indicated by the engine configuration scheme. Accordingly, controller 140 may control one or more flows of gas and/or one or more flows of fuel to cylinders 114, which causes engine 110 to provide an optimal performance in regard to one or more parameters of the set of input parameters.

The number and arrangement of devices and networks shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
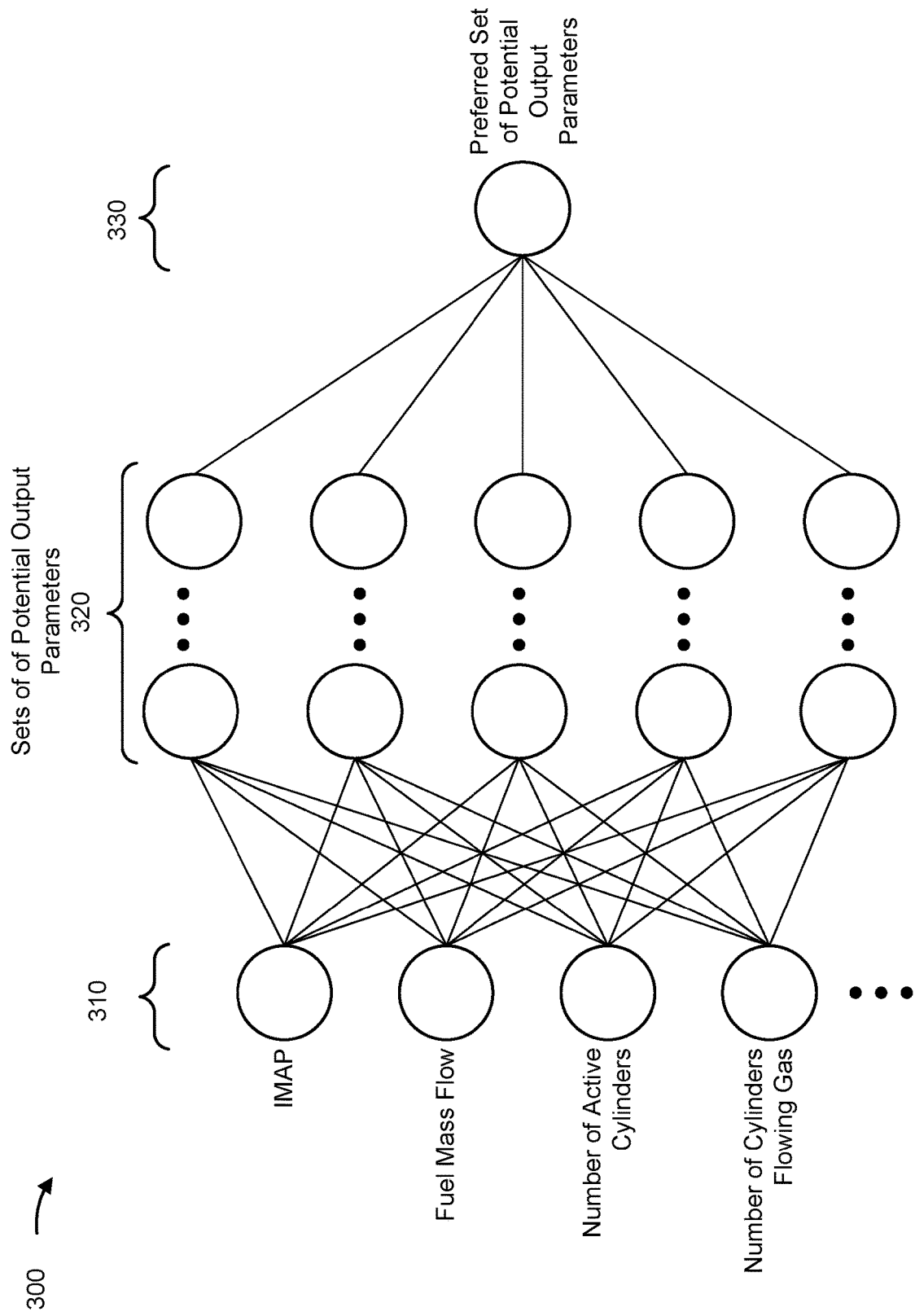
FIG. 3 is a diagram of an example implementation of an engine model that may be used by example engine optimization controller described herein.

FIG. 3 is a diagram of an example implementation of an engine model 300 that may be used by engine optimization controller 144. As shown, neural network 300 has an input layer 310, one or more intermediate layers 320 (referred to herein individually as "intermediate layer 320" and collectively as "intermediate layers 320"), and an output layer 330. As described herein, example engine model 300 may receive values for a set of input parameters (e.g., of an engine) as inputs to input layer 310, use intermediate layers 320 to process the values for the set of input parameters and determine a plurality of sets of potential output parameters (e.g., according to respective potential engine configuration schemes), and select and/provide a preferred (e.g., optimal) set of potential output parameters via output layer 330. Accordingly, engine optimization controller 144 may select a potential engine configuration scheme associated with the preferred set of potential output parameters as the engine configuration scheme and present it to controller 140.

In the example of FIG. 3, input layer 310 receives an IMAP, a fuel mass flow, a number of active cylinders 114, and number of cylinders 114 flowing gas as inputs to engine model 300. The inputs may correspond to a set of measured parameters of an engine (e.g., engine 110) while the engine is under operation. Engine model 300 may use the intermediate layers (e.g., hidden layers) to determine the plurality of sets of potential output parameters based on the set of input parameters. For example, the intermediate layers may include one or more feedforward layers and/or one or more recurrent layers of a neural network to determine the plurality of sets of potential output parameters. The one or more feedforward layers and/or recurrent layers may include a plurality of coupled nodes that are linked according to being trained as described herein. In this way, links between nodes of intermediate layers 320 may correspond to predictions, classifications, and/or the like that are associated with the parameters that would lead to identifying a preferred set of potential output parameters and selecting an engine configuration scheme (e.g., that is associated with the optimal set of potential output parameters) for controlling one or more components of the engine.

As indicated above, FIG. 3 is provided as an example. Other examples may differ from what is described in connection with FIG. 3.

Figure 4:
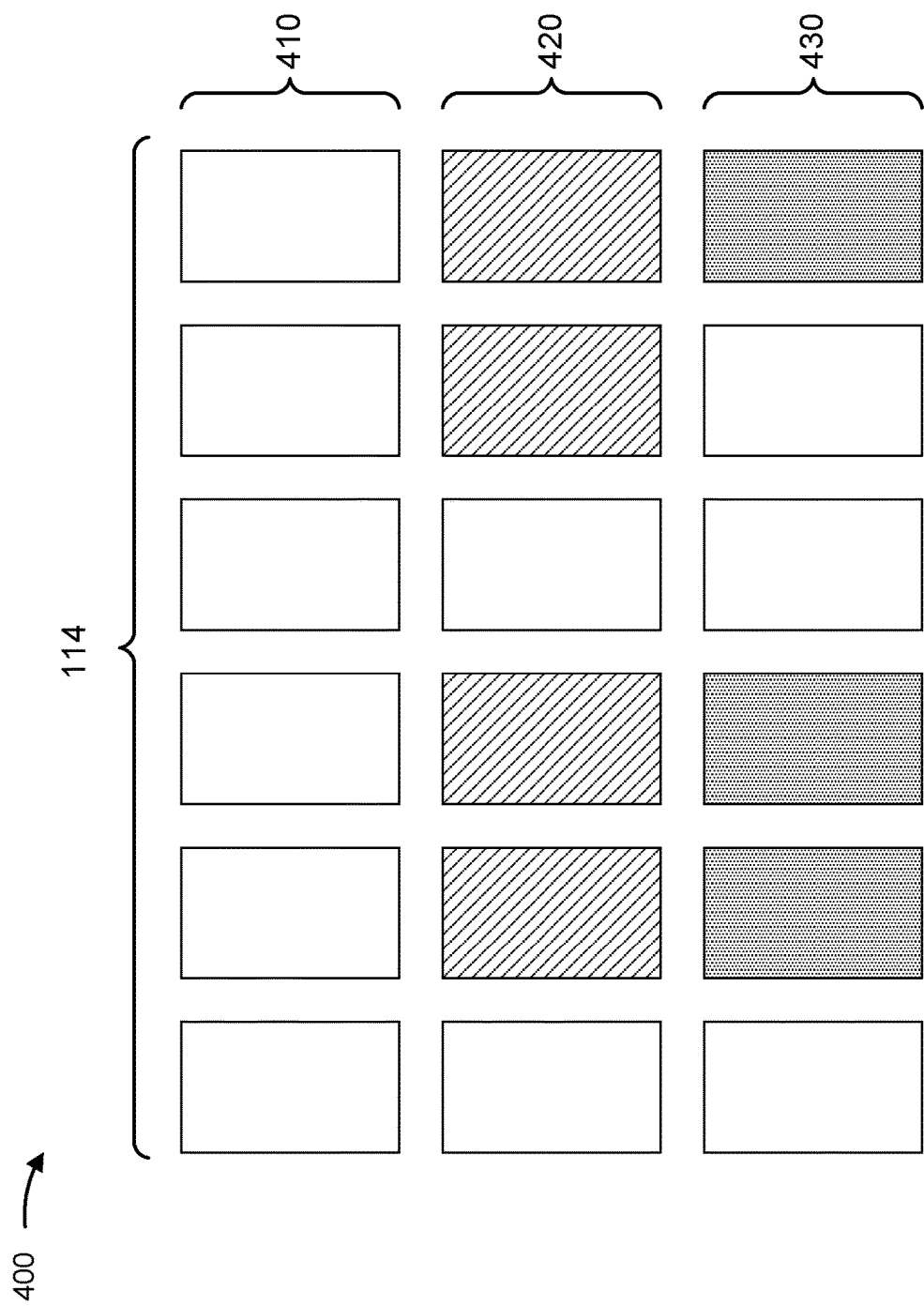
FIG. 4 is a diagram of example configurations of cylinders of an engine that are possible in accordance with different engine configuration schemes described herein.

FIG. 4 is a diagram 400 of example configurations of cylinders 114 (e.g., shown as six cylinders) that are possible in accordance with different engine configuration schemes. For example, as shown by reference number 410, when a first engine configuration scheme (e.g., that is determined by engine optimization controller 144) indicates that six cylinders, of cylinders 114, are to be active and to receive gas, controller 140 may cause all of cylinders 114 to be active and to receive gas (e.g., as indicated by rectangles with a lack of shading and pattern). In another example, as shown by reference number 420, when a second engine configuration scheme (e.g., that is determined by engine optimization controller 144) indicates that two cylinders, of cylinders 114, are to be active and to receive gas and that four cylinders, of cylinders 114, are to be inactive and to receive gas, controller 140 may select and cause two particular cylinders, of cylinders 114, to be active and to receive gas (e.g., as indicated by rectangles with a lack of shading and pattern) and four particular cylinders, of cylinder 114, to not be active and to receive gas (e.g., as indicated by rectangles with a diagonal pattern). In an additional example, as shown by reference number 430, when a third engine configuration scheme (e.g., that is determined by engine optimization controller 144) indicates that three cylinders, of cylinders 114, are to be active and to receive gas and that three cylinders, of cylinders 114, are to be inactive and to not receive gas, controller 140 may select and cause three particular cylinders, of cylinders 114, to be active and to receive gas (e.g., as indicated by rectangles with a lack of shading and pattern) and three particular cylinders, of cylinder 114, to be inactive and to not receive gas (e.g., as indicated by rectangles with shading). Accordingly, an engine configuration scheme may cause any number of cylinders, of cylinders 114, to be active and to receive gas, any number of cylinders to be inactive and to receive gas, and/or any number of cylinders to be inactive and to not receive gas.

As indicated above, FIG. 4 is provided as an example. Other examples may differ from what is described in connection with FIG. 4.

Figure 5:
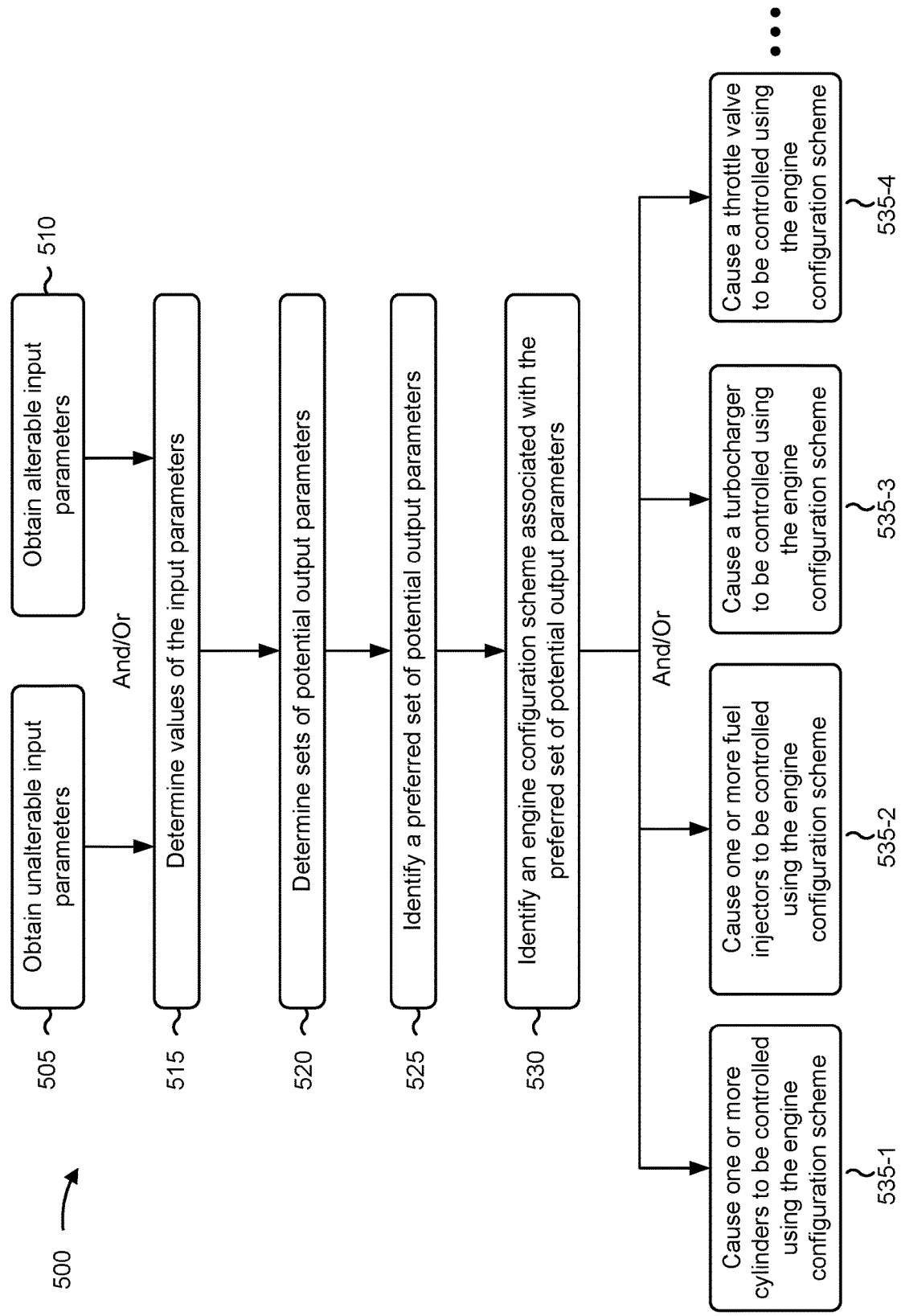
FIG. 5 is a flowchart of an example process associated with control of cylinders of an engine according to an engine configuration scheme.

FIG. 5 is a flowchart of an example process 500 associated with controlling cylinders of an engine according to an engine configuration scheme. One or more process blocks of FIG. 5 may be performed by a controller (e.g., engine optimization controller 144). One or more process blocks of FIG. 5 may be performed by another device or a group of devices separate from or including the controller, such as another controller (e.g., controller 140), a control device (e.g., control device 210), a sensor (e.g., sensor 220), and/or the like.

As shown in FIG. 5, process 500 may include obtaining unalterable input parameters (block 505). For example, the controller may obtain unalterable input parameters associated with an engine under operation, as described above.

Additionally, or alternatively, as further shown in FIG. 5, process 500 may include obtaining alterable input parameters (block 510). For example, the controller may obtain alterable input parameters associated with an engine under operation, as described above.

As shown in FIG. 5, process 500 may include determining values of the input parameters (block 515). For example, the controller may determine values of the input parameters, as described above.

As shown in FIG. 5, process 500 may include determining sets of potential output parameters (block 520). For example, the controller may process, using an engine model, the values of the input parameters to determine the sets of potential output parameters, as described above.

As shown in FIG. 5, process 500 may include identifying a preferred set of potential output parameters (block 525). For example, the controller may select the preferred set of potential output parameters from the sets of potential output parameters, as described above.

As further shown in FIG. 5, process 500 may include identifying an engine configuration scheme associated with the preferred set of potential output parameters (block 530). For example, the controller may identity an engine configuration scheme associated with the preferred set of potential output parameters, as described above. The configuration scheme may indicate a first number of cylinders, of one or more cylinders of an engine, to be active and to receive gas; a second number of cylinders, of the one or more cylinders, to be inactive and to receive gas; and/or a third number of cylinders, of the one or more cylinders, to be inactive and to not receive gas.

As further shown in FIG. 5, process 500 may include causing one or more cylinders to be controlled using the engine configuration scheme (block 535-1). For example, the controller may cause the one or more cylinders of the engine to be controlled according to the engine configuration scheme, as described above.

Additionally, or alternatively, as further shown in FIG. 5, process 500 may include causing one or more fuel injectors to be controlled using the engine configuration scheme (block 535-2). For example, the controller may cause the one or more fuel injectors of the engine to be controlled according to the engine configuration scheme, as described above.

Additionally, or alternatively, as further shown in FIG. 5, process 500 may include causing a turbocharger to be controlled using the engine configuration scheme (block 535-3). For example, the controller may cause a turbocharger of the engine to be controlled according to the engine configuration scheme, as described above.

Additionally, or alternatively, as further shown in FIG. 5, process 500 may include causing a throttle valve to be controlled using the engine configuration scheme (block 535-4). For example, the controller may cause a throttle valve of the engine to be controlled according to the engine configuration scheme, as described above.

Process 500 may include additional implementations, such as any single implementation or any combination of implementations described in connection with one or more other processes described elsewhere herein.

Although FIG. 5 shows example blocks of process 500, process 500 may include additional blocks, fewer blocks, different blocks, or differently arranged blocks than those depicted in FIG. 5. Additionally, or alternatively, two or more of the blocks of process 500 may be performed in parallel.

INDUSTRIAL APPLICABILITY

The above-described techniques allow an engine optimization controller 144 of an engine 110 to determine an engine configuration scheme that can be used (e.g., by controller 140) to control cylinders 114, fuel injectors 126, and/or any other components (e.g., EGR system 120 and/or mixer 122, among other examples) of engine 110. In this way, engine optimization controller 144 may allow engine 110 to be configured in a way to provide an optimal and/or preferred performance in regard to multiple parameters, such as a torque provided by engine 110, an amount of pollution in exhaust gas of engine 110, a temperature of exhaust gas of engine 110, and/or a load of engine 110, among other examples. Such a performance would not otherwise be possible when using individual component configuration schemes. Moreover, by allowing independent control of providing fuel or gas to individual cylinders 114, engine 110 may be operated according to actual needs of engine 110, thereby conserving resources associated with operating engine 110. Such resources may include consumable resources (e.g., fuel, lubricant, and/or the like), hardware/material resources of components of engine 110, natural resources (e.g., by reducing emissions), and/or the like.

Furthermore, using an engine model (e.g., that includes a neural network), as described herein may allow for more variations of quantities of a set of input parameters and/or more variations of values of the set of input parameters used to determine an engine configuration scheme. This may enable dynamic determinations of engine configuration schemes, which is not possible using previous techniques that utilize static mappings of cylinder configurations to various other parameters of engine 110.

The foregoing disclosure provides illustration and description, but is not intended to be exhaustive or to limit the implementations to the precise form disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system comprising:
one or more cylinders of an engine;
one or more fuel injectors configured to inject fuel into respective cylinders of the one or more cylinders of the engine; and
an engine optimization controller configured to, while the engine is under operation:
  determine values of a set of input parameters of the engine;
  process, using an engine model, the values to determine a plurality of sets of potential output parameters;
  determine, based on the plurality of sets of potential output parameters, an engine configuration scheme, wherein the engine configuration scheme indicates a first number of cylinders, of the one or more cylinders, to be active and to receive gas and at least one of:
    a second number of cylinders, of the one or more cylinders, to be inactive and to receive gas, or
    a third number of cylinders, of the one or more cylinders, to be inactive and to not receive gas; and
  provide the engine configuration scheme to another controller to cause the other controller to control the one or more cylinders and the one or more fuel injectors according to the engine configuration scheme.

2. The system of claim 1, wherein the engine model is a neural network and the engine optimization controller is configured to, when processing the values to determine the plurality of sets of potential output parameters:
  inputting the values into an input layer of the engine model; and
  causing one or more feedforward layers or one or more recurrent layers of the engine model to determine the plurality of sets of potential output parameters.

3. The system of claim 1, wherein, prior to determining the values of the set of input parameters, the engine model is configured based on training the engine model using historical training values for the set of input parameters.

4. The system of claim 1, wherein the engine optimization controller providing the engine configuration scheme to the other controller causes:
  one or more valves associated with a first set of cylinders, of the one or more cylinders, to be positioned to allow the first set of cylinders to flow gas; and
  one or more valves associated with a second set of cylinders, of the one or more cylinders, to be positioned to prevent the second set of cylinders from flowing gas.

5. The system of claim 1, wherein the engine optimization controller providing the engine configuration scheme to the other controller causes:
  a first set of cylinders, of the one or more cylinders, to receive fuel from the one or more fuel injectors and to receive gas via valves associated with the first set of cylinders,
    wherein a number of the first set of cylinders equals the first number of cylinders;
  a second set of cylinders, of the one or more cylinders, to not receive fuel from the one or more fuel injectors and to receive gas via valves associated with the second set of cylinders,
    wherein a number of the second set of cylinders equals the second number of cylinders; and
  a third set of cylinders, of the one or more cylinders, to not receive fuel from the one or more fuel injectors and to not receive gas via valves associated with the third set of cylinders,
    wherein a number of the third set of cylinders equals the third number of cylinders.

6. The system of claim 1, wherein the engine optimization controller providing the engine configuration scheme to the other controller causes:
  a first set of fuel injectors, of the one or more fuel injectors, to provide fuel to a first set of cylinders, of the one or more cylinders; and
  a second set of fuel injectors, of the one or more fuel injectors, to not provide fuel to a second set of cylinders, of the one or more cylinders.

7. The system of claim 1, wherein the set of input parameters includes at least one of:
  a brake mean effective pressure associated with the engine;
  an indicated mean effective pressure associated with the engine;
  a friction mean-effective pressure associated with the engine;
  a pumping mean effective pressure associated with the engine;
  a torque associated with the engine;
  an exhaust gas temperature associated with the engine;
  a peak cylinder pressure associated with the engine;
  a fresh mass gas flow associated with the engine;
  a total mass gas flow associated with the engine;
  a total mass exhaust flow associated with the engine;
  an equivalence ratio associated with the engine;
  a mass of charge associated with the engine;
  a fuel mass flow associated with the engine;
  a total fuel power associated with the engine;
  a volumetric efficiency associated with the engine;
  an amount of unburnt gas associated with the engine;
  an exhaust fuel conversion efficiency associated with the engine;
  a gross fuel conversion efficiency associated with the engine;
  an amount of pollution associated with an exhaust gas of the engine;
  a number of active and/or inactive cylinders of the one or more cylinders;
  a number of cylinders, of the one or more cylinders, receiving and/or flowing gas;
  a timing associated with the one or more fuel injectors;
  a pressure associated with the one or more fuel injectors;
  an ambient temperature associated with the engine;
  an amount of harshness associated with the engine;
  an amount of noise associated with the engine; or
  an amount of mechanical vibration associated with the engine.

8. A controller, comprising:
one or more memories; and
one or more processors communicatively coupled to the one or more memories, configured to:
  determine values of a set of input parameters of an engine under operation;
  process, using an engine model, the values to determine a plurality of sets of potential output parameters;
  determine, based on the plurality of sets of potential output parameters, an engine configuration scheme, wherein the engine configuration scheme indicates a first number of cylinders, of one or more cylinders of the engine, to be active and to flow gas and at least one of:
    a second number of cylinders, of the one or more cylinders, to be inactive and to flow gas, or
    a third number of cylinders, of the one or more cylinders, to be inactive and to not flow gas; and
  provide the engine configuration scheme to another controller to cause the other controller to control the one or more cylinders and one or more fuel injectors according to the engine configuration scheme.

9. The controller of claim 8, wherein, prior to determining the values of the set of input parameters, the engine model is configured based on training the engine model using historical training values for the set of input parameters.

10. The controller of claim 9, wherein the training values for the set of input parameters are historical values based on a plurality of different calibrations for optimizing engines under operation.

11. The controller of claim 8, wherein providing the engine configuration scheme to the other controller causes at least one of:
  a first set of cylinders, of the one or more cylinders, to be active; or
  a second set of cylinders, of the one or more cylinders, to be inactive.

12. The controller of claim 8, wherein providing the engine configuration scheme to the other controller causes:
  the one or more fuel injectors to provide fuel to a first set of cylinders; and
  the one or more fuel injectors to refrain from providing fuel to a second set of cylinders.

13. The controller of claim 8, wherein providing the engine configuration scheme to the other controller causes:
  one or more valves associated with a first set of cylinders, of the one or more cylinders, to be positioned to allow the first set of cylinders to flow gas; and
  one or more valves associated with a second set of cylinders, of the one or more cylinders, to be positioned to prevent the second set of cylinders from flowing gas.

14. The controller of claim 8, wherein the engine configuration scheme indicates configuration information concerning one or more components of the engine other than the one or more fuel injectors and the one or more cylinders.

15. A method, comprising:
  obtaining, by a controller, a set of input parameters of an engine under operation;
  determining, by the controller, values of the set of input parameters;
  processing, by the controller, the values to determine a plurality of sets of potential output parameters;
  determining, based on the plurality of sets of potential output parameters, an engine configuration scheme, wherein the engine configuration scheme indicates a first subset of cylinders, of a set of cylinders of the engine, to be active and to flow gas and at least one of:
    a second subset of cylinders, of the set of cylinders, to be inactive and to flow gas, or
    a third subset of cylinders, of the set of cylinders, to be inactive and to not flow gas; and
  causing, by the controller, the one or more cylinders and one or more fuel injectors of the engine to be controlled according to the engine configuration scheme.

16. The method of claim 15, wherein causing the one or more cylinders and one or more fuel injectors to be controlled according to the engine configuration scheme causes:
  the first subset of cylinders to receive fuel and to receive gas,
  the second subset of cylinders to not receive fuel and to receive gas, or
  the third subset of cylinders to not receive fuel and to not receive gas.

17. The method of claim 15, wherein causing the one or more cylinders and one or more fuel injectors of the engine to be controlled according to the engine configuration scheme causes the one or more fuel injectors to provide fuel to the first subset of cylinders.

18. The method of claim 15, wherein causing the one or more cylinders and one or more fuel injectors of the engine to be controlled according to the engine configuration scheme causes the one or more fuel injectors to not provide fuel to the second subset of cylinders and to the third subset of cylinders.

19. The method of claim 15, wherein causing the one or more cylinders and one or more fuel injectors of the engine to be controlled according to the engine configuration scheme causes:
  one or more valves associated with the first subset of cylinders to be positioned to allow gas to flow to the first subset of cylinders; and
  one or more valves associated with the second subset of cylinders to be positioned to allow gas to flow to the second subset of cylinders.

20. The method of claim 15, wherein causing the one or more cylinders and one or more fuel injectors of the engine to be controlled according to the engine configuration scheme causes one or more valves associated with the third subset of cylinders to be positioned to prevent gas to flow to the third subset of cylinders.

* * * * *